United States Patent
Cai et al.

(10) Patent No.: US 9,014,072 B2
(45) Date of Patent: *Apr. 21, 2015

(54) USER EQUIPMENT COMPONENT CARRIER ALLOCATION

(71) Applicant: BlackBerry Limited, Waterloo (CA)

(72) Inventors: Zhijun Cai, Euless, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,197

(22) Filed: Mar. 31, 2014

(65) Prior Publication Data

US 2014/0211724 A1    Jul. 31, 2014

Related U.S. Application Data (63) Continuation of application No. 12/750,333, filed on Mar. 30, 2010, now Pat. No. 8,705,424.

(60) Provisional application No. 61/164,788, filed on Mar. 30, 2009.

(51) Int. Cl.
  *G08C 17/00* (2006.01)
  *H04W 4/00* (2009.01)
  *H04W 36/00* (2009.01)
  (Continued)

(52) U.S. Cl.
  CPC ........... *H04W 72/0486* (2013.01); *H04L 5/001* (2013.01); *H04L 5/0094* (2013.01); *H04W 72/042* (2013.01)

(58) Field of Classification Search
  CPC ...................................... H04W 52/02
  USPC .................... 370/329, 311, 241, 332
  See application file for complete search history.

(56) References Cited

U.S. PATENT DOCUMENTS

| | | |
|---|---|---|
| 2006/0013182 A1 | 1/2006 | Balasubramanian et al. |
| 2008/0247375 A1 | 10/2008 | Muharemovic et al. |

(Continued)

FOREIGN PATENT DOCUMENTS

| | | |
|---|---|---|
| EP | 1953971 A1 | 8/2008 |
| WO | 2009099303 A2 | 8/2009 |

OTHER PUBLICATIONS

Cai, Zhijun, et al.; U.S. Appl. No. 12/750,333, filed Mar. 30, 2010; Title: User Equipment Component Carrier Allocation.

(Continued)

*Primary Examiner* — Kiet Tang
(74) *Attorney, Agent, or Firm* — Conley Rose, P.C.; J. Robert Brown, Jr.

(57) ABSTRACT

A method for configuring at least one component carrier (CC) for a physical downlink shared channel (PDSCH). The method includes receiving a CC configuration using a signaling protocol, wherein the CC is assigned using a semi-static configuration. Also included is a user equipment (UE) comprising a processor configured to receive a CC configuration for at least one CC for a PDSCH using a signaling protocol, wherein the CC is assigned using a semi-static configuration. Also included is an access node comprising a processor configured to transmit a CC configuration for at least one CC for a PDSCH using a signaling protocol, wherein the CC is assigned using a semi-static configuration.

19 Claims, 7 Drawing Sheets

(51) Int. Cl.
*H04W 72/00* (2009.01)
*H04W 72/04* (2009.01)
*H04L 5/00* (2006.01)

(56) References Cited

U.S. PATENT DOCUMENTS

| | | | |
|---|---|---|---|
| 2009/0257405 A1* | 10/2009 | Stamoulis et al. | 370/332 |
| 2009/0270103 A1 | 10/2009 | Pani et al. | |
| 2010/0130218 A1 | 5/2010 | Zhang et al. | |
| 2010/0232373 A1* | 9/2010 | Nory et al. | 370/329 |
| 2010/0240372 A1 | 9/2010 | Wu | |
| 2010/0254328 A1 | 10/2010 | McBeath et al. | |
| 2010/0296473 A1 | 11/2010 | Kim et al. | |
| 2011/0267957 A1* | 11/2011 | Du et al. | 370/241 |

OTHER PUBLICATIONS

3GPP TS 36.212 V8.5.0; 3rd Generation Partnership Project; Technical Specification Group Radio Access Network; Evolved Universal Terrestrial Radio Access (E-UTRA); Multiplexing and Channel Coding; Release 8; Dec. 2008; 58 pages.
3GPP TS 36.213 V8.5.0; 3rd Generation Partnership Project; Technical Specification Group Radio Access Network; Evolved Universal Terrestrial Radio Access (E-UTRA); Physical Layer Procedures; Release 8; Dec. 2008; 74 pages.
3GPP TS 36.304 V8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pages.
3GPP TS 36.331 V8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pages.
3GPP TR 36.814 V0.4.1; 3rd Generation Partnership Project; Technical Specification Group Radio Access Network; Further Advancements for E-UTRA Physical Layer Aspects; Release 9; Feb. 2009; 31 pages.
TSG-RAN WG1 #55bis; "Control Signaling for Carrier Aggregation"; R1-090375; Ljubljana, Slovenia; Jan. 12-16, 2009; 3 pages.
Office Action dated Dec. 21, 2012; U.S. Appl. No. 12/750,333, filed Mar. 30, 2010; 32 pages.
Office Action dated Jul. 19, 2013; U.S. Appl. No. 12/750,333, filed Mar. 30, 2010; 22 pages.
Notice of Allowance dated Feb. 13, 2014; U.S. Appl. No. 12/750,333, filed Mar. 30, 2010; 16 pages.
PCT International Search Report; Application No. PCT/US2010/029226; Jan. 7, 2011; 3 pages.
PCT Written Opinion of the International Searching Authority; Application No. PCT/US2010/029226; Jan. 7, 2011; 4 pages.
PCT International Preliminary Report on Patentability; Application No. PCT/US2010/029226; Nov. 18, 2011; 5 pages.
Australian Office Action; Application No. 2010234774; Apr. 22, 2013; 3 pages.
Chinese Office Action; Application No. 201080023921.X; Nov. 19, 2013; 15 pages.
Mexican Office Action; Application No. MX/a/2011/010305; Oct. 30, 2012; 6 pages.
3GPP TSG-RAN WG1 Meeting #56; "Downlink Control Structure for LTE-A"; R1-090628; Athens, Greece; Feb. 9-13, 2009; 5 pages.
3GPP TSG RAN WG1 #56; "Uplink Control Channel Transmission for LTE-Advanced"; R1-090656; Athens, Greece; Feb. 9-13, 2009; 5 pages.
TSG-RAN WG1 #56; "Downlink Control Structure for LTE-Advanced System"; R1-090647; Athens, Greece; Feb. 9-13, 2009; 5 pages.
European Examination Report; Application No. 10729958.8; Sep. 5, 2014; 6 pages.
Chinese Office Action as Received in Co-pending Application No. 201080023921.X on May 26, 2014; 6 pages. (No English translation available).
Chinese Office Action as Recieved in Co-pending Application No. 20180023921.X on Nov. 17, 2014; 5 pages. (No English translation available).
Canadian Office Action; Application No. 2,757,283; Feb. 2, 2015; 5 pages.

* cited by examiner

USER EQUIPMENT COMPONENT CARRIER ALLOCATION

BACKGROUND

As used herein, the terms "user equipment" and "UE" can refer to mobile devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" can also refer to devices that have similar capabilities but that are not transportable, such as fixed line telephones, desktop computers, set-top boxes, or network nodes. When a UE is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a communication session for a user. Also, the terms "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) or LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, an LTE or LTE-A eNB, or a router that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases it is desirable for an access device to transmit a large amount of data to a UE in a short amount of time. For instance, a video cast may include large amounts of audio and video data that has to be transmitted to a UE over a short amount of time. As another instance, a UE may run several applications that all have to transmit data packets to an access device at about the same time which may cause the combined data transfer to be extremely large. One way to increase the rate of data transmission is to use multiple component carriers (CC), e.g., multiple carrier frequencies instead of a single CC to communicate between an access device and the UEs.

LTE-A is a mobile communication standard that is currently being investigated by the 3rd Generation Partnership Project (3GPP) as a major enhancement of LTE. In LTE-A, the access device may transmit user data to the UE using a plurality of CCs. The CCs may be distributed about equally over a predetermined combined bandwidth, e.g., each CC may comprise about an equal portion of the combined bandwidth. The CCs may also be used to transmit control data over a Physical Downlink Control Channel (PDCCH). The user data and control data may be transmitted using separate coding, where a plurality of PDCCHs and a plurality of corresponding CCs may be allocated to the UE, or using joint coding, where a shared PDCCH and a plurality of associated CCs may be allocated.

Disclosed herein is a system and method for assigning a plurality of CCs to the user data transmission and the PDCCH transmission. Using a semi-static configuration, the access device may assign the CCs to a UE and subsequently switch or change the assigned CCs for the UE. In the semi-static configuration, the access device may signal the UE, for instance using a signaling protocol, such as Radio Resource Control (RRC) signaling or Media Access Control (MAC) signaling. In the case of separate coding, the same CCs for the user data transmission and the corresponding PDCCH may be signaled using the same parameter. In the case of joint coding, different CCs may be signaled for the user data transmission and the PDCCH, for instance using a bitmap to reduce the signaling overhead. The semi-static configuration may also be implemented for uplinks (ULs) established to transport user data and control data from the UEs to the access device.

Figure 1:
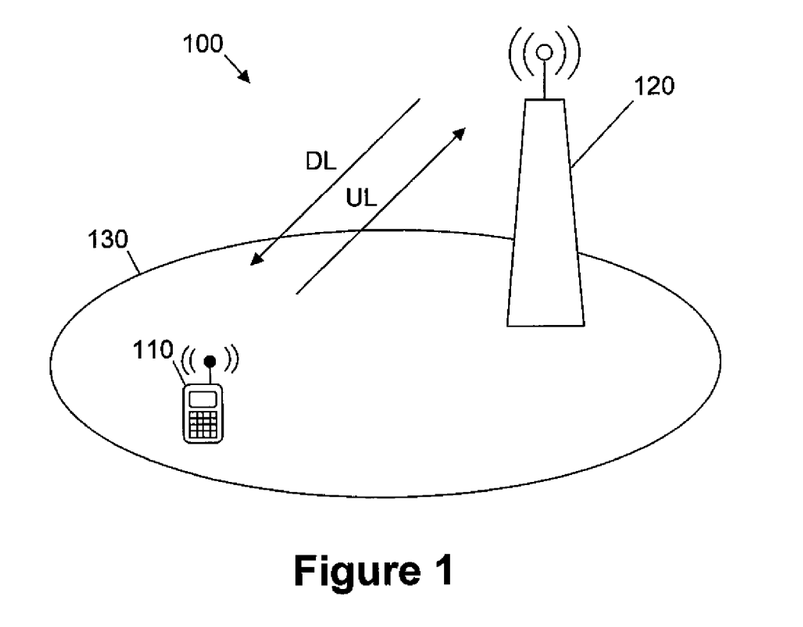
FIG. 1 is a diagram of an embodiment of a wireless communication system according to an embodiment of the disclosure.

FIG. 1 illustrates an embodiment of a wireless communication system 100. FIG. 1 is exemplary and may have other components or arrangements in other embodiments. The wireless communication system 100 may comprise at least one UE 110 and an access device 120. The UE 110 may wirelessly communicate, via a wireless link, with the network access device 120. The wireless link may conform to any of a plurality of telecommunications standards or initiatives, such as those described in the 3GPP, including LTE, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including Interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The access device 120 may be an eNB, a base station, or other components that promote network access for the UE 110. The access device 120 may communicate with any UE 110, which may be within the same cell 130, directly via a direct link. For instance, the direct link may be a point-to-point link established between the access device 120 and the UE 110 and used to transmit and receive signals between the two. The UE 110 may also communicate with at least a second UE 110 within the same cell. The access device 120 may also communicate with other components or devices (not shown) to provide these other components of the wireless communication system 100 access to other networks.

The UE 110 and the access device 120 may wirelessly communicate via at least one downlink (DL) channel, at least one uplink (UL) channel, or both. The downlink and uplink channels may be physical channels, which may be statically, semi-statically, or dynamically allocated network resources. For instance, the downlink and uplink channels may comprise at least one physical downlink shared channel (PDSCH), at least one physical downlink control channel (PDCCH), at least one physical uplink shared channel (PUSCH), at least one physical uplink control channel (PUCCH), or combinations thereof. In an embodiment, the downlink and uplink channels may be established using frequency-division duplexing (FDD), where signals are received and transmitted at different frequencies. Additionally or alternatively, the downlink and uplink channels may be established using time-division, where the signals may be transmitted, received, or both at different transmission time intervals (TTIs).

In an embodiment, the access device 120 may transmit user data, such as voice, video, or other communication data, to the UE 110 over a DL, such as the PDSCH. The access device 120 may also transmit control data, such as resource allocation and hybrid automatic repeat request (HARQ) information, to the UE over the PDCCH. The access device 120 may receive from the UE 110 user data over an UL, such as the PUSCH, control data over the PUCCH, or both. The wireless communication system 100, may support the LTE-A standard, where the user data and control data may be transported using a plurality of CCs that extend a predetermined bandwidth. For example, the user data and control data may be transmitted using about five CCs, which may be distributed about equally over a total combined bandwidth of about 100 mega Hertz (MHz), e.g., each CC may comprise a bandwidth of about 20 mega Hertz (MHz). The user data and control data may also be transported over each CC using the 3GPP Release 8 (R8) standard. As such, the data may be received over a single CC using the R8 standard or over multiple CCs using the LTE-A standard.

Figure 2:
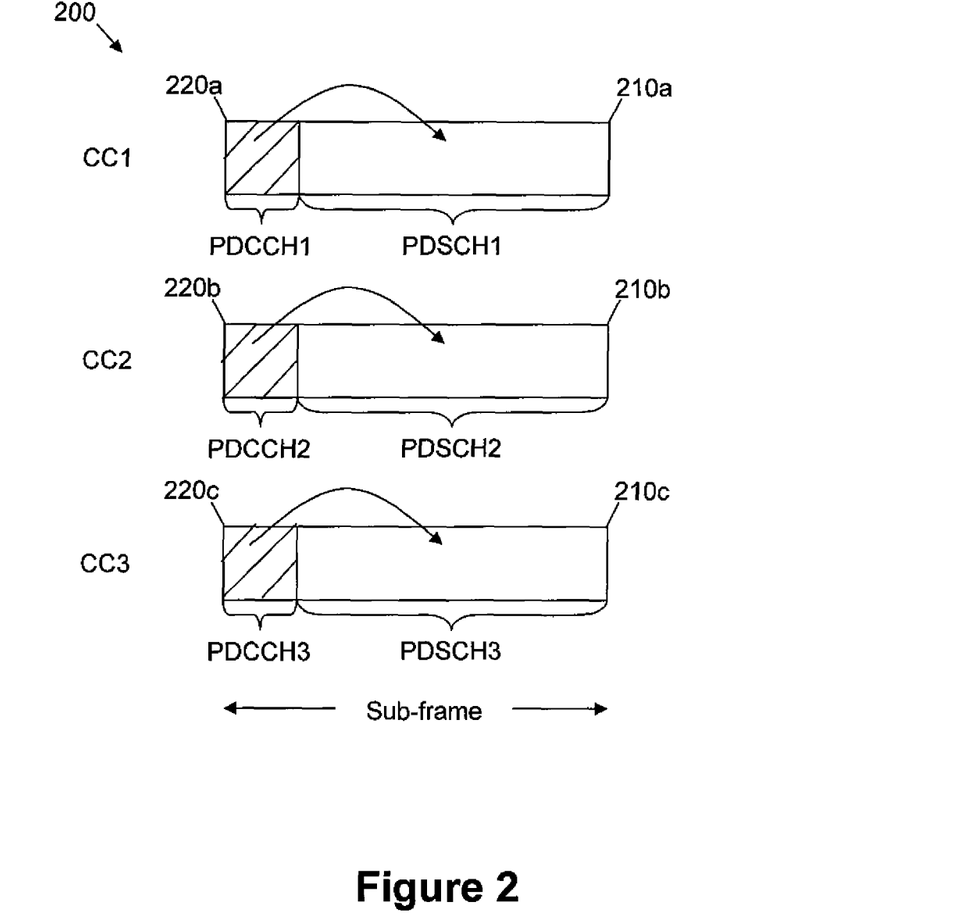
FIG. 2 is a diagram of an embodiment of a separate coding scheme according to an embodiment of the disclosure.

FIG. 2 illustrates an embodiment of a separate coding scheme 200, which may be used to transport a plurality of user data streams 210a, 210b, and 210c and a plurality of control data streams 220a, 220b, and 220c that correspond to the user data streams 210a, 210b, and 210c, respectively. The user data streams 210a, 210b, and 210c and the control data streams 220a, 220b, and 220c may be transmitted using a plurality of CCs, CC1, CC2, and CC3, over a plurality of PDSCHs and a plurality of PDCCHs associated with the PDSCHs. Specifically, the different user data streams 210a, 210b, and 210c and corresponding control data streams 220a, 220b, and 220c may be transmitted using the different CCs, CC1, CC2, and CC3. Additionally, each of the user data streams 210a, 210b, and 210c and corresponding control data 220a, 220b, and 220c may be transmitted using the same CC1, CC2, or CC3 over each PDSCH and each associated PDCCH. For example, the user data stream 210a and corresponding control data stream 220a may be transmitted using CC1, the user data stream 210b and corresponding control data stream 220b may be transmitted using CC2, and the user data stream 210c and corresponding control data stream 220c may be transmitted using CC3. The user data streams 210a, 210b, and 210c and corresponding control data streams 220a, 220b, and 220c may also be transmitted within the same sub-frame, which may be equal to about one millisecond.

Figure 3:
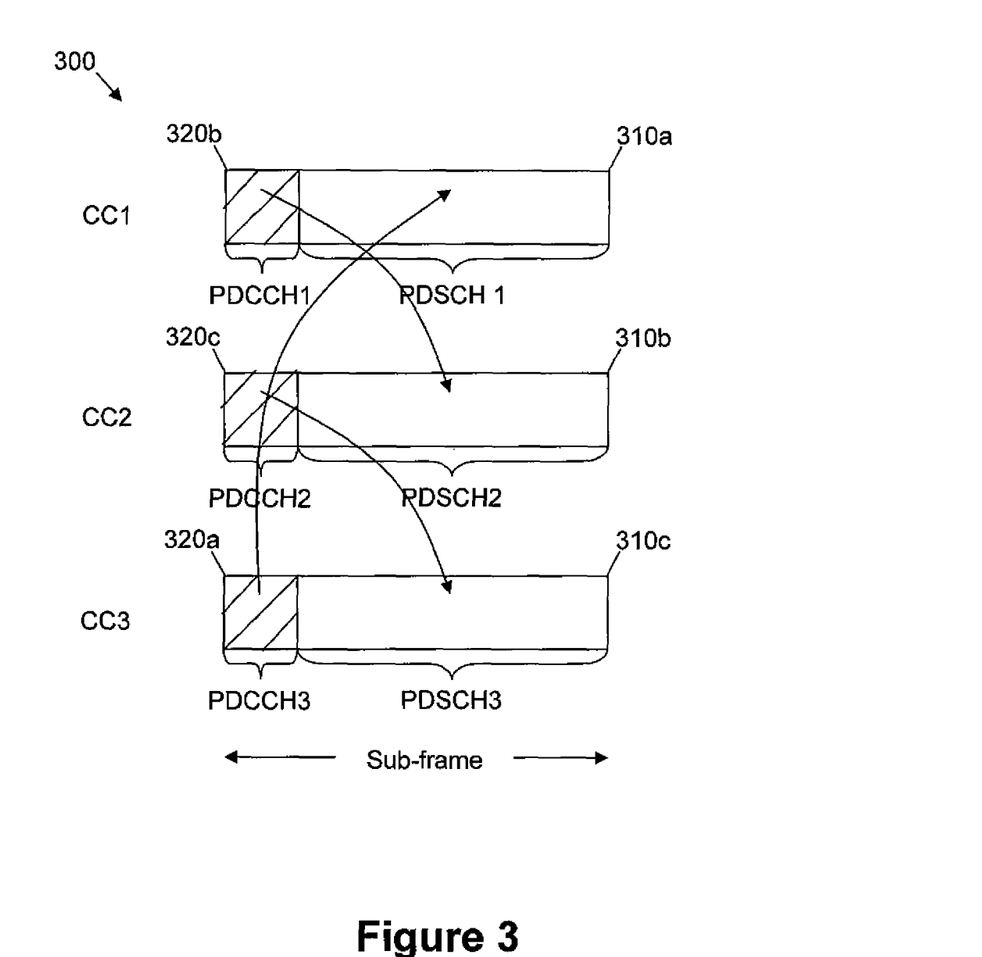
FIG. 3 is a diagram of another embodiment of a separate coding scheme according to an embodiment of the disclosure.

FIG. 3 illustrates an embodiment of a separate coding scheme 300, which may also be used to transport a plurality of user data streams 310a, 310b, and 310c and a plurality of control data streams 320a, 320b, and 320c that correspond to the user data streams 310a, 310b, and 310c, respectively. Similar to the separate coding scheme 200, the user data streams 310a, 310b, and 310c and corresponding control data streams 320a, 320b, and 320c may be transmitted using a plurality of CCs, CC1, CC2, and CC3, over a plurality of PDSCHs and a plurality of associated PDCCHs. However, any of the user data streams 310a, 310b, or 310c and corresponding control data streams 320a, 320b, and 320c may be transmitted over the PDSCH and the associated PDCCH using different CCs. For example, the user data stream 310a may be transmitted using CC1 and the corresponding control data stream 320a may be transmitted using CC3, the user data stream 310b may be transmitted using CC2 and the corresponding control data stream 320b may be transmitted using CC1, and the user data stream 310c may be transmitted using CC3 and the corresponding control data stream 320c may be transmitted using CC2.

Figure 4:
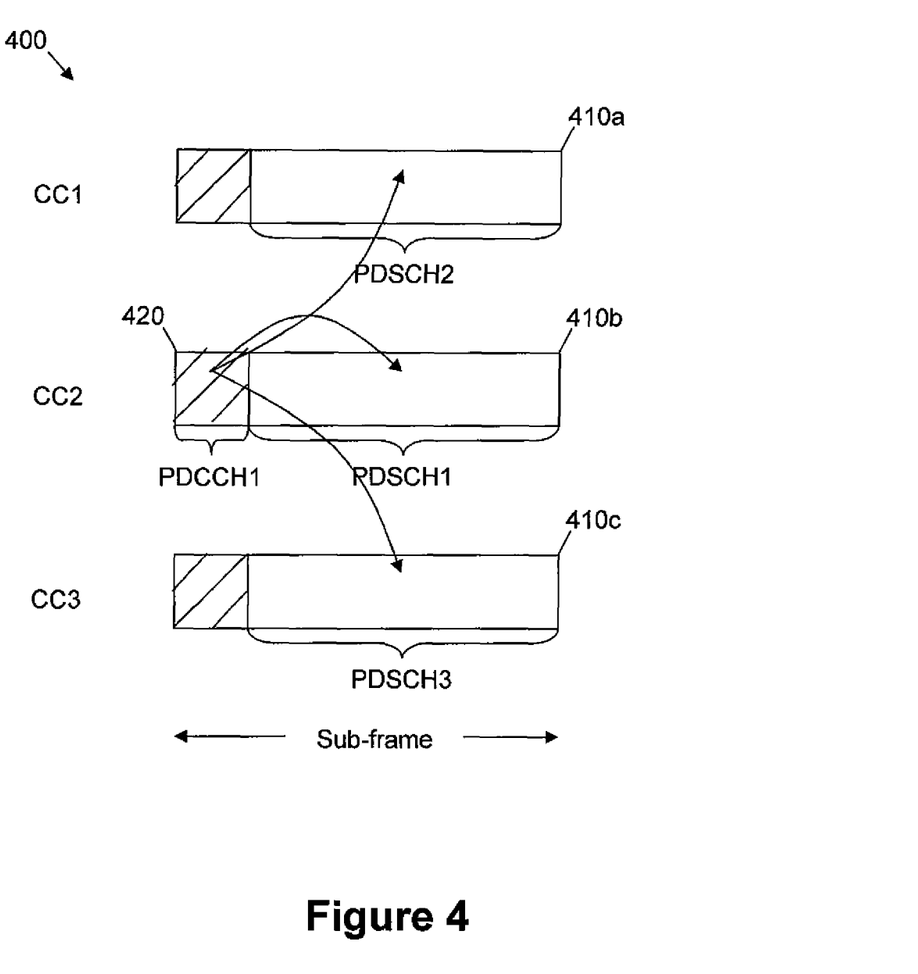
FIG. 4 is a diagram of an embodiment of a joint coding scheme according to an embodiment of the disclosure.

FIG. 4 illustrates an embodiment of a joint coding scheme 400, which may be used to transport a plurality of user data streams 410a, 410b, and 410c and a shared control data stream 420 corresponding to the user data streams 410a, 410b, 410c. The user data streams 410a, 410b, and 410c may be transmitted using a plurality of CCs, CC1, CC2, and CC3, over a plurality of PDSCHs, and the shared control data stream 420 may be transmitted over one PDCCH associated with the PDSCHs. Specifically, the different user data streams 410a, 410b, and 410c may be transmitted using the different CCs, CC1, CC2, and CC3, and the shared control data stream 420 may be transmitted using one CC. For example, the user data stream 410a may be transmitted using CC1, the user data stream 410b and the shared control data stream 420 may be transmitted using CC2, and the user data stream 410c may be transmitted using CC3.

Figure 5:
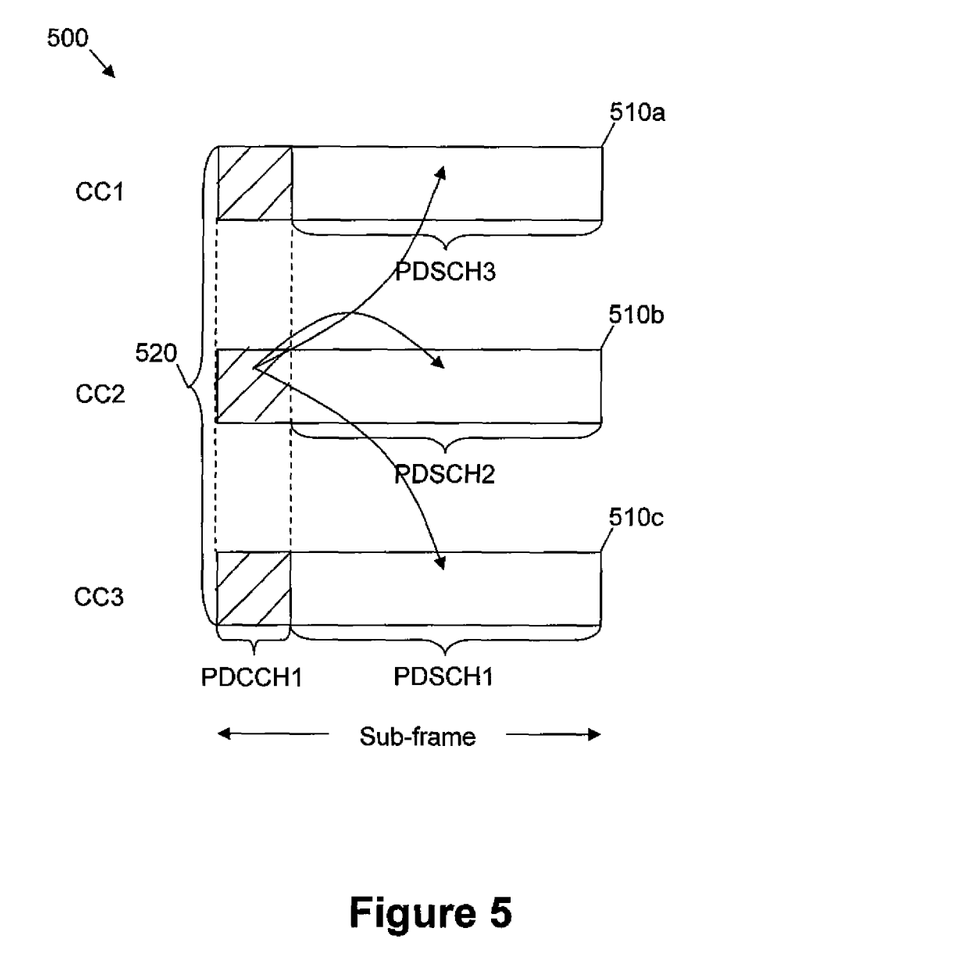
FIG. 5 is a diagram of another embodiment of a joint coding scheme according to an embodiment of the disclosure.

FIG. 5 illustrates an embodiment of a joint coding scheme 500, which may also be used to transport a plurality of user data streams 510*a*, 510*b*, and 510*c* and a shared control data stream 520 corresponding to the user data streams 510*a*, 510*b*, and 510*c*. Similar to the joint coding scheme 400, the user data streams 510 may be transmitted using a plurality of CCs, CC1, CC2, and CC3, over a plurality of PDSCHs, and the different user data streams 510*a*, 510*b*, and 510*c* may be transmitted using the different CCs, CC1, CC2, and CC3. The shared control data stream 520 may also be transmitted over one PDCCH associated with the PDSCHs. However, the shared control data stream 520 may be transmitted using the combined bandwidth of all or at least some of the CCs, CC1, CC2, and CC3. For example, the user data stream 510*a* may be transmitted using CC1, the user data stream 510*b* may be transmitted using CC2, and the user data stream 510*c* may be transmitted using CC3. Further, the shared control data stream 520 may be transmitted using CC1, CC2, and CC3, where each CC may be used to transmit a portion of the shared control data stream 520.

In an embodiment, the UE 110 may transmit the user data over the PDSCH using a semi-static configuration. Accordingly, at least one CC may be assigned to the user data at some time intervals, which may be greater than about a duration of a sub-frame, e.g., about one millisecond. For example, the time delays between switching or reassigning the CCs over the PDSCH may be equal to about a few seconds or minutes. The time intervals of the semi-configuration may be larger than the time intervals used in a dynamic configuration, which may be on the order of a duration of a sub-frame or equal to about one millisecond. As such, the CCs may be assigned or switched less frequently using the semi-static configuration, which may reduce the procedure complexity, reduce communications and hence power consumption, or both.

Figure 6:
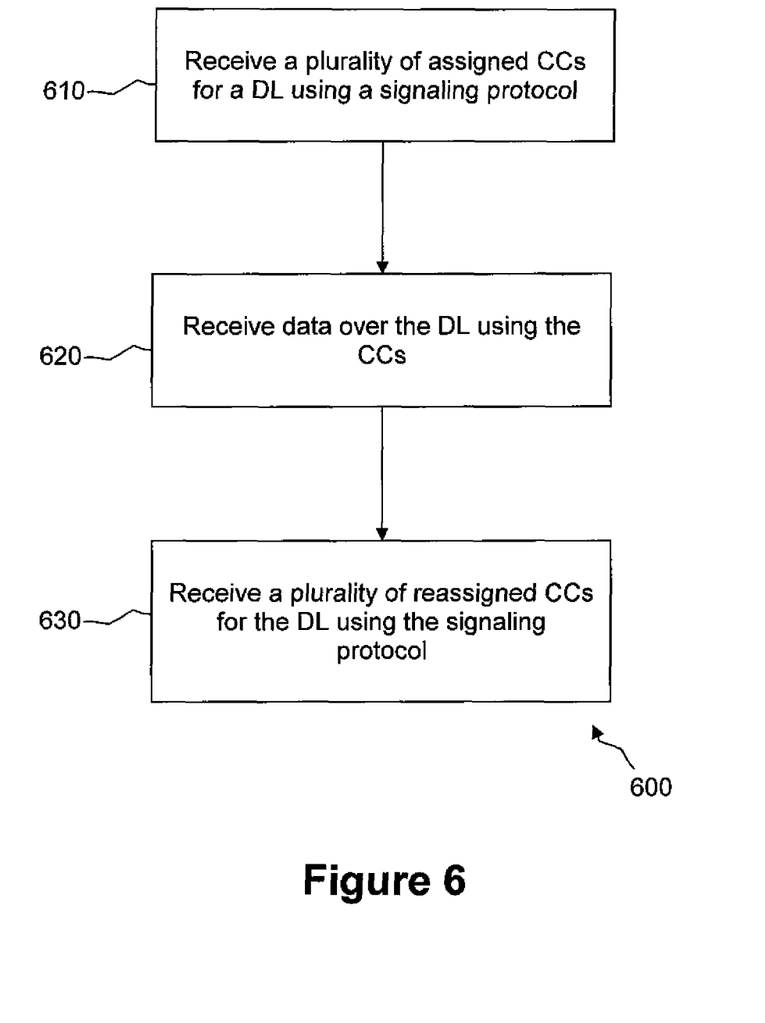
FIG. 6 is a flowchart of a method for configuring a plurality of CCs for a downlink according to an embodiment of the disclosure.

FIG. 6 illustrates an embodiment of a method 600 for configuring a plurality of CCs for the PDSCH. In block 610, the access device 120 may assign the CCs for the PDSCH to the UE 110 using a signaling protocol and the semi-static configuration. For instance, during a call setup, the access device 120 may signal to the UE 110 information about at least one CC for the PDSCH, using the RRC protocol. The RRC protocol may be responsible for the assignment, configuration, and release of radio resources between a UE and a network node or other LTE equipment. The RRC protocol is described in detail in 3GPP Technical Specification (TS) 36.331. According to the RRC protocol, the two basic RRC modes for a UE are defined as "idle mode" and "connected mode." During the connected mode or state, the UE may exchange signals with the network and perform other related operations, while during the idle mode or state, the UE may shut down at least some of its connected mode operations. Idle and connected mode behaviors are described in detail in 3GPP TS 36.304 and TS 36.331. Alternatively, the access device 120 may assign the CCs using MAC control elements, which may be less reliable than RRC signaling. In block 620, the access device 120 may transmit user data to the UE 110 over the PDSCH using the assigned CCs. In block 630, the access device 120 may reconfigure the CCs for the PDSCH using a signaling protocol. For instance, during the call, the access device 120 may switch or reassign at least some of CCs to the UE 110 via RRC signaling or MAC control elements. To improve the reliability of the CC reconfiguration, the assigned CC information may be synchronized between the access device 120 and the UE 110, for instance using a "start time" in the RRC or MAC signal. The start time may be a time offset relative to a reference time, such as a call initiation time, or may be an absolute time. Alternatively, the assigned CC information may be synchronized according to the R8 standard.

In an embodiment, when the access device 120 reconfigures the CCs, the quantity of the reassigned CCs may be different than the quantity of the previously assigned CCs to the UE 110. For, instance, the UE 110 may be initially assigned a maximum number of CCs, e.g., equal to about five CCs, and may then be reassigned less than the maximum number of CCs. The access device 120 may reduce the number of assigned CCs to reduce the duration of the connected mode or state of the UE 110, which may save some of the battery power of the UE 110. The access device 120 may also reduce the number of assigned CCs to establish load balancing for the CCs in the network. For example, the access device 120 may reduce the number of CCs for a first UE 110 by reassigning some of the CCs from the first UE 110 to a second UE 110, which may establish a new connection. In some embodiments, the number of assigned CCs for the UE 110 may be increased to support an increase in the transmission data rate for the UE 110.

Additionally, the access device 120 may assign and/or switch a plurality of CCs for a PDCCH in a manner substantially similar to the CC reconfiguration for the PDSCH, e.g., using the semi-static configuration and a signaling protocol, such as RRC signaling or MAC signaling. For instance, in the case of separate coding, a plurality of PDCCHs may be associated with a plurality of PDSCHs and the same CCs may be signaled for any PDSCH and its associated PDCCH using a single parameter or indicator. In some separate coding schemes where a PDSCH may be assigned different CCs than its associated PDCCH, two parameters may be used when signaling the CCs for the PDSCH and its associated PDCCH.

In the case of joint coding, where one PDCCH may be associated with a plurality of PDSCHs, the CCs assigned for the PDCCH may be different than the CCs assigned for the PDSCH. For example, three CCs comprising a combined bandwidth of about 60 MHz may be assigned for the PDSCH and one or two CCs may be assigned for the PDCCH. Hence, two parameters may be signaled for the PDSCH and the PDCCH using RRC or MAC signaling. In an embodiment, a bitmap may be used to signal the CCs for the PDSCH and the PDCCH to reduce the signaling overhead. For example, to signal the three CCs for the PDSCH and the two CCs for the PDCCH, five bits in the signaled bitmap may be set.

In an embodiment, the CCs may be assigned for a UL, such as the PUSCH, and the PUCCH in a manner substantially similar to the PDSCH and the PDCCH. For instance, a semi-static configuration and signaling protocol may be used to assign and/or switch a plurality of CCs for any UL and its associated PUCCH. Further, the CCs may be signaled using the same parameter for the UL and its associated PUCCH in a separate coding scheme or using a bitmap in a joint coding scheme.

Figure 7:
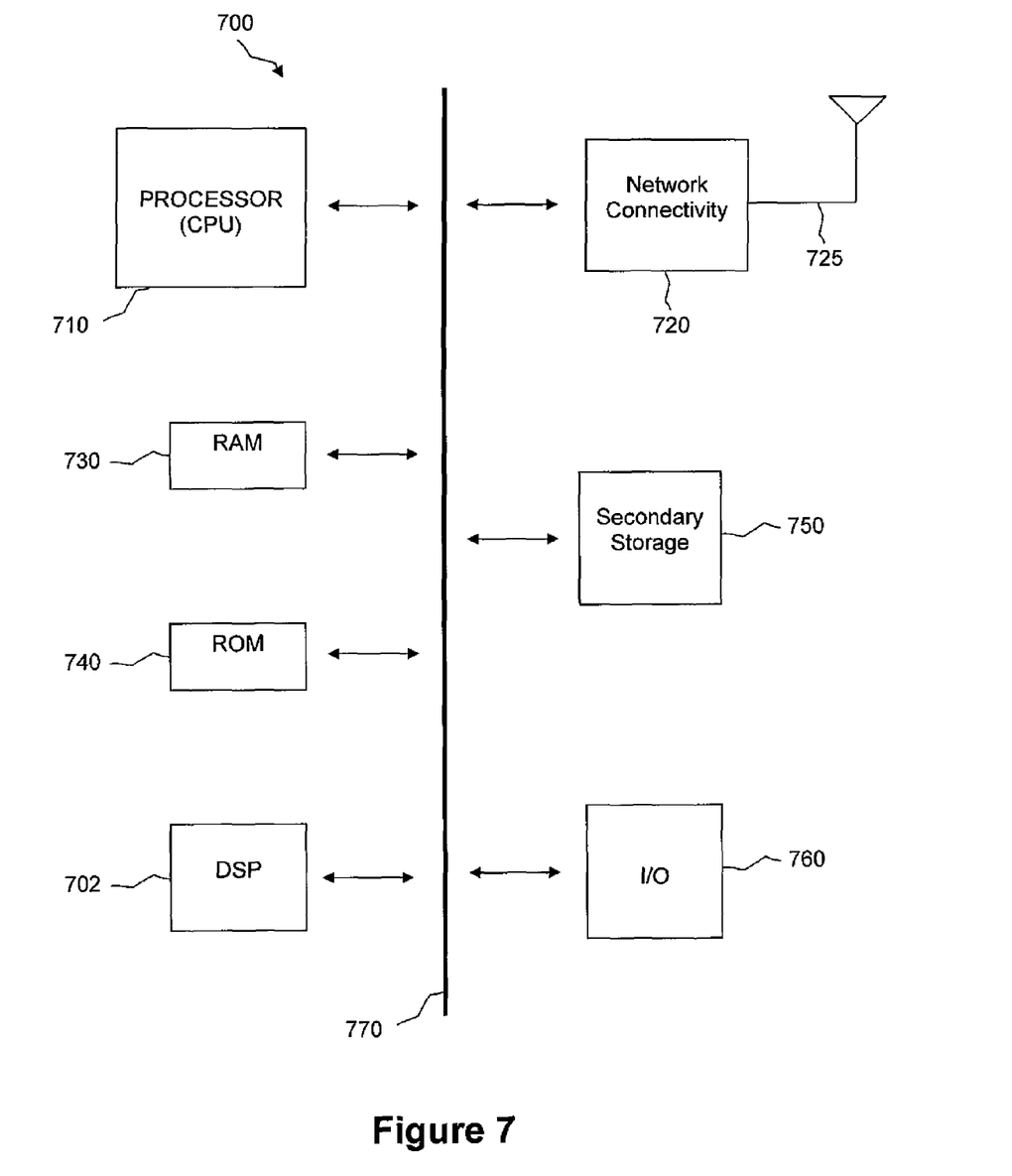
FIG. 7 illustrates a processor and related components suitable for implementing the several embodiments of the present disclosure.

The UA 110 and other components described above might include a processing component that is capable of executing instructions related to the actions described above. FIG. 7 illustrates an example of a system 700 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a DSP 702. Although the DSP 702 is shown as a separate component, the DSP 702 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

The following are incorporated herein by reference for all purposes: 3GPP TS 36.212, 3GPP TS 36.213, 3GPP TS 36.304, 3GPP TS 36.331, 3GPP TS 36.814, and R1-090375.

In an embodiment, a method is provided for configuring at least one CC for a PDSCH. The method includes receiving a CC configuration using a signaling protocol, wherein the CC is assigned using a semi-static configuration.

In an embodiment, the method for configuring the CC for the PDSCH further comprises receiving a CC configuration for at least one CC for a PDCCH associated with the PDSCH using the signaling protocol, wherein the CC is assigned using the semi-static configuration.

In an embodiment, the method for configuring the CC for the PDSCH further comprises transmitting a CC configuration for at least one CC for an UL using a signaling protocol, wherein the CC is assigned using the semi-static configuration.

In an embodiment, the method for configuring the CC for the PDSCH further comprises transmitting a CC configuration for at least one CC for a PUCCH associated with the UL using the signaling protocol, wherein the CC is assigned using the semi-static configuration.

In another embodiment, a method is provided for configuring at least one CC for a PDSCH. The method includes transmitting a CC configuration using a signaling protocol, wherein the CC is assigned using a semi-static configuration.

In another embodiment, a UE is provided. The UE includes a processor configured to receive a CC configuration for at least one CC for a PDSCH using a signaling protocol, wherein the CC is assigned using a semi-static configuration.

In another embodiment, an access node is provided. The access node includes a processor configured to transmit a CC configuration for at least one CC for a PDSCH using a signaling protocol, wherein the CC is assigned using a semi-static configuration.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for configuring a component carrier (CC) in a wireless communication network, the method comprising:
   receiving, by a user equipment (UE) in the wireless communication network, a CC configuration for a physical downlink shared channel (PDSCH), using a signaling protocol, wherein at least one CC is assigned for the PDSCH using a semi-static configuration; and
   receiving, by the user equipment, a CC configuration for a Physical Downlink Control Channel (PDCCH) associated with the PDSCH, using the signaling protocol,
   wherein the CC configuration for the PDSCH is based on a traffic load for the UE, and
   wherein a number of assigned CCs for the PDSCH is increased to support an increase in a transmission data rate for the UE.

2. The method of claim 1, wherein receiving the CC configuration for the PDSCH comprises receiving a CC configuration for using maximum allowed CCs for the PDSCH.

3. The method of claim 1, wherein the PDCCH is configured using a separate coding scheme, and wherein the same CCs are assigned to the PDSCH and the associated PDCCH using the same signaling parameter.

4. The method of claim 1, wherein the PDCCH is configured using a joint coding scheme, and wherein different CCs are assigned to the PDSCH and the associated PDCCH, using a bitmap.

5. The method of claim 1, wherein the signaling protocol comprises a Radio Resource Control (RRC) protocol or Media Access Control (MAC) signaling.

6. The method of claim 1, further comprising:
transmitting, by the user equipment, a CC configuration for at least one CC for an uplink (UL) using a signaling protocol, wherein the at least one CC for the UL is assigned using the semi-static configuration.

7. The method of claim 1, further comprising:
transmitting, by the user equipment, a CC configuration for at least one CC for a Physical Uplink Control Channel (PUCCH) associated with the UL using the signaling protocol, wherein the at least one CC for the PUCCH is assigned using the semi-static configuration.

8. A method for configuring a component carrier (CC) in a wireless communication network, the method comprising:
transmitting, by an access node in the wireless communication network, a CC configuration for a physical downlink shared channel (PDSCH), using a signaling protocol, wherein at least one CC is assigned for the PDSCH using a semi-static configuration; and
transmitting, by the access node, a CC configuration for a Physical Downlink Control Channel (PDCCH) associated with the PDSCH, using the signaling protocol,
wherein the CC configuration for the PDSCH is based on a traffic load for a user equipment (UE) in the wireless communication network, and
wherein a number of assigned CCs for the PDSCH is increased to support an increase in a transmission data rate for the UE.

9. The method of claim 8, further comprising:
receiving a CC configuration for at least one CC for an uplink (UL) using a signaling protocol, wherein the at least one CC for the UL is assigned using the semi-static configuration.

10. A user equipment (UE) for use in a wireless communication network, the user equipment comprising:
a processor configured to receive a component carrier (CC) configuration for a physical downlink shared channel (PDSCH), using a signaling protocol, wherein at least one CC is assigned for the PDSCH using a semi-static configuration,
wherein the processor is further configured to receive a CC configuration for a Physical Downlink Control Channel (PDCCH) associated with the PDSCH, using the signaling protocol,
wherein the CC configuration for the PDSCH is based on a traffic load for the UE, and
wherein a number of assigned CCs for the PDSCH is increased to support an increase in a transmission data rate for the UE.

11. The UE of claim 10, wherein the CC configuration for the PDSCH is configured to use maximum allowed CCs for the PDSCH.

12. The UE of claim 10, wherein the at least one CC assigned for the PDSCH is synchronized with an access node in the wireless communication network, using a start time.

13. The UE of claim 10, wherein the processor is further configured to transmit a CC configuration for at least one CC for an uplink (UL) using a signaling protocol, wherein the at least one CC for the UL is assigned using the semi-static configuration.

14. The UE of claim 10, wherein the processor is further configured to transmit a CC configuration for at least one CC for a Physical Uplink Control Channel (PUCCH) associated with the UL using the signaling protocol, wherein the at least one CC for the PUCCH is assigned using the semi-static configuration.

15. An access node for use in a wireless communication network, the access node comprising:
a processor configured to transmit a component carrier (CC) configuration for a physical downlink shared channel (PDSCH), using a signaling protocol, wherein at least one CC is assigned for the PDSCH using a semi-static configuration; and
wherein the processor is further configured to transmit a CC configuration for a Physical Downlink Control Channel (PDCCH) associated with the PDSCH, using the signaling protocol,
wherein the CC configuration for the PDSCH is based on a traffic load for a user equipment (UE) in the wireless communication network, and
wherein a number of assigned CCs for the PDSCH is increased to support an increase in a transmission data rate for the UE.

16. The access node of claim 15, wherein the processor is further configured to receive a CC configuration for at least one CC for an uplink (UL) using a signaling protocol, wherein the at least one CC for the UL is assigned using the semi-static configuration.

17. The access node of claim 15, wherein the processor is further configured to receive a CC configuration for at least one CC for a Physical Uplink Control Channel (PUCCH) associated with the UL using the signaling protocol, wherein the at least one CC for the PUCCH is assigned using the semi-static configuration.

18. A non-transitory computer readable medium storing instructions which are configured to cause a user equipment (UE) device to execute a method comprising the operations of:
receiving a CC configuration for a physical downlink shared channel (PDSCH), using a signaling protocol, wherein at least one CC is assigned for the PDSCH using a semi-static configuration; and
receiving a CC configuration for a Physical Downlink Control Channel (PDCCH) associated with the PDSCH, using the signaling protocol,
wherein the CC configuration for the PDSCH is based on a traffic load for the UE, and
wherein a number of assigned CCs for the PDSCH is increased to support an increase in a transmission data rate for the UE.

19. A non-transitory computer readable medium storing instructions which are configured to cause an access node device to execute a method comprising the operations of:
transmitting a CC configuration for a physical downlink shared channel (PDSCH), using a signaling protocol, wherein at least one CC is assigned for the PDSCH using a semi-static configuration; and transmitting a CC configuration for a Physical Downlink Control Channel (PDCCH) associated with the PDSCH, using the signaling protocol,
wherein the CC configuration for the PDSCH is based on a traffic load for a user equipment (UE), and
wherein a number of assigned CCs for the PDSCH is increased to support an increase in a transmission data rate for the UE.

* * * * *